(12) United States Patent
Birman et al.

(10) Patent No.: US 9,302,587 B2
(45) Date of Patent: Apr. 5, 2016

(54) INSTRUMENT CLUSTER INCLUDING TELLTALE ILLUMINATION USING A LIGHT GUIDE

(71) Applicant: Continental Automotive Systems, Inc., Auburn Hills, MI (US)

(72) Inventors: Vyacheslav Birman, Auburn Hills, MI (US); Daniel Pasquale Tollis, Novi, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 95 days.

(21) Appl. No.: 14/261,954

(22) Filed: Apr. 25, 2014

(65) Prior Publication Data

US 2015/0306958 A1 Oct. 29, 2015

(51) Int. Cl.
*G08B 21/00* (2006.01)
*B60K 35/00* (2006.01)

(52) U.S. Cl.
CPC ........... *B60K 35/00* (2013.01); *B60K 2350/203* (2013.01)

(58) Field of Classification Search
CPC ........................................................ B60K 35/00
USPC ......... 340/441, 459, 461, 688, 815.4, 815.42; 362/23.21
See application file for complete search history.

(56) References Cited

U.S. PATENT DOCUMENTS

| | | | |
|---|---|---|---|
| 6,971,758 B2 | 12/2005 | Inui et al. | |
| 7,876,235 B2 * | 1/2011 | Fournier | B60K 37/02 340/438 |
| 8,158,900 B2 | 4/2012 | Maatta | |
| 2012/0206251 A1 | 8/2012 | Birman et al. | |

* cited by examiner

*Primary Examiner* — Jeffery Hofsass

(57) ABSTRACT

An instrumentation gauge for a vehicle includes a single piece light guide divided into multiple sections by an opaque light guide insert. The single piece light guide includes at least one telltale graphic printed on a surface of the light guide in each of the light guide sections. When light is communicated into a given section of the light guide, the light scatters on the telltale graphic causing the graphic to be illuminated and distinguishable from a same or similar colored background.

13 Claims, 4 Drawing Sheets

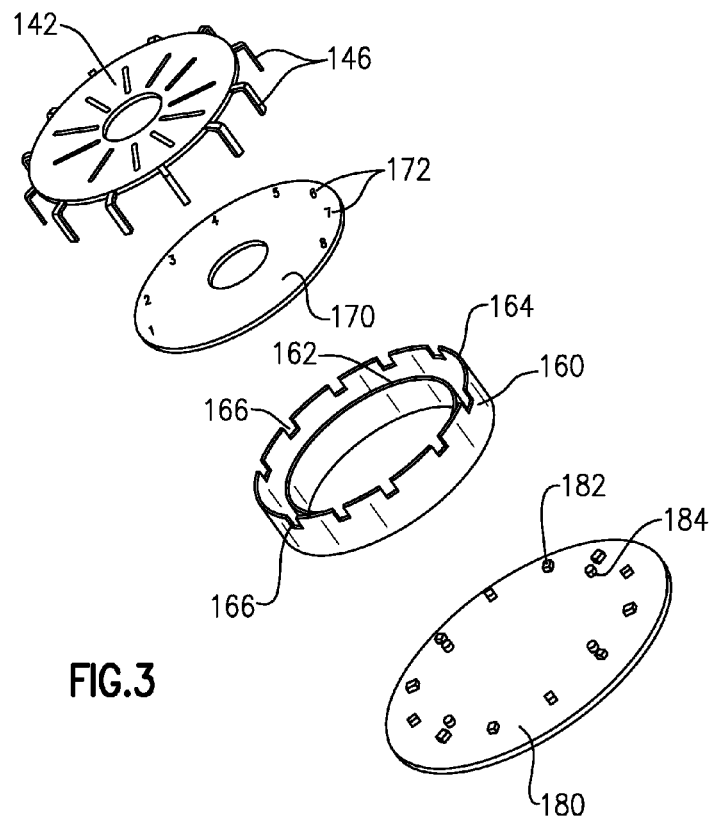
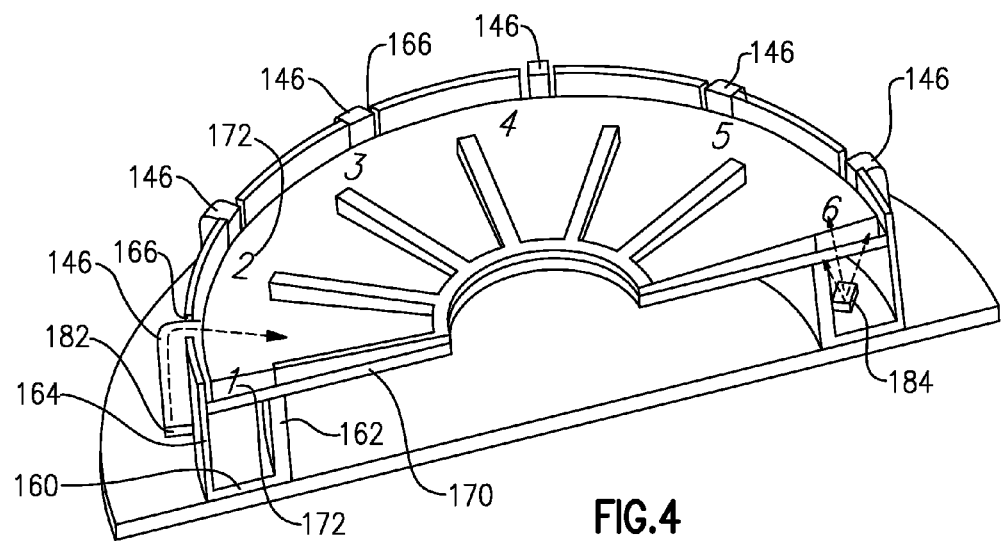

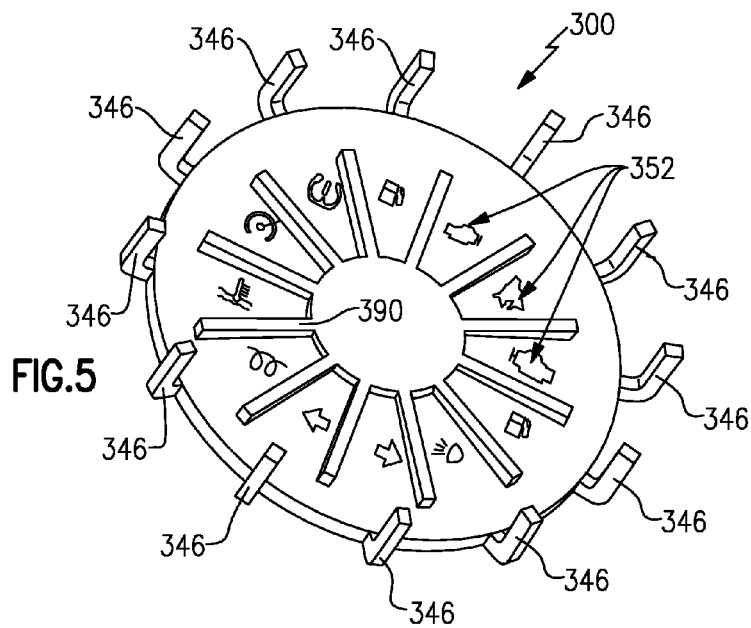
FIG.5
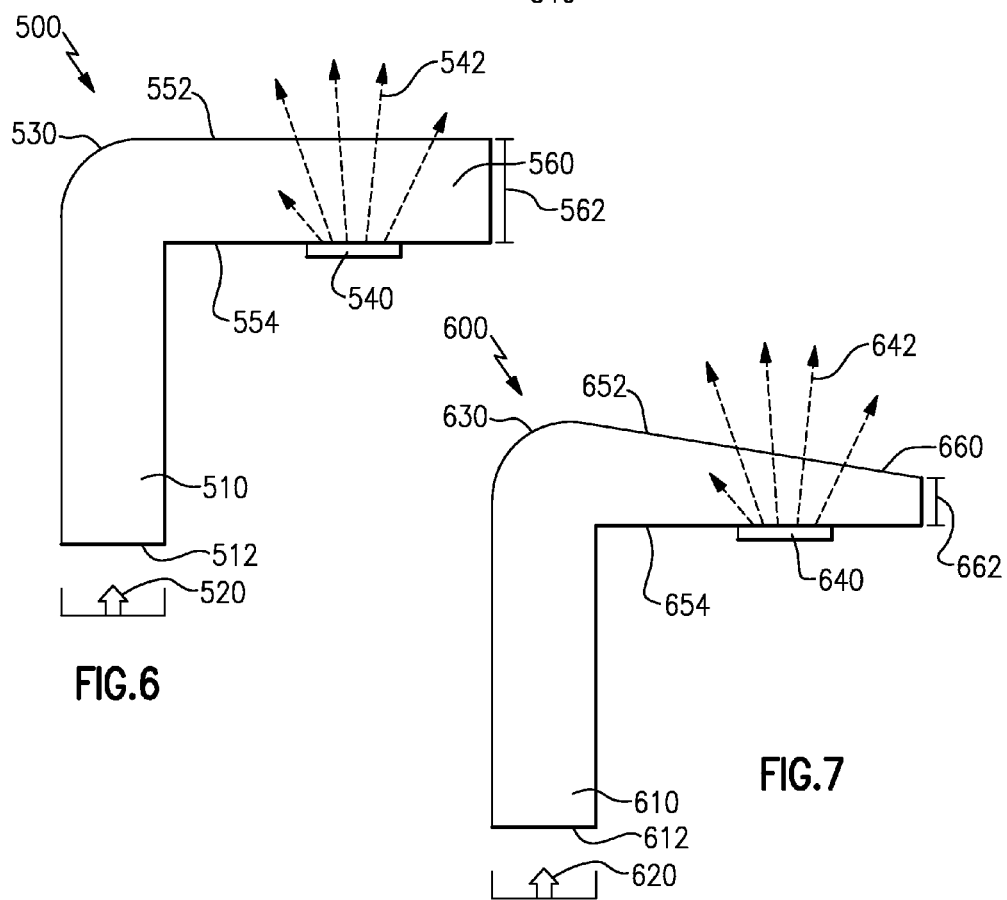
FIG.6
FIG.7

INSTRUMENT CLUSTER INCLUDING TELLTALE ILLUMINATION USING A LIGHT GUIDE

TECHNICAL FIELD

The present disclosure relates generally to instrument clusters for a vehicle, and more specifically to a method and apparatus for illuminating telltales on an instrument cluster.

BACKGROUND

Instrument clusters for a vehicle are typically located on a vehicle dashboard and may include a speedometer, tachometer, engine condition indicator, ABS braking indicator, and other vehicle marks. This cluster of display marks may have lighting to illuminate each mark, when appropriate. For example, an ABS braking mark may be illuminated when the vehicle is undergoing ABS braking. In previous designs, this lighting was provided by individual lamps or LEDs that illuminate each indicator of the dashboard. The type of lighting used in these designs takes up significant space and can require a high voltage circuit to supply current to each of the lamps. A high voltage further requires insulation to protect against shock, thereby increasing the cost and size of the instrument cluster.

One alternative to the lamp illumination described above is the use of optical light guides to bring illumination to each of the display marks of the instrument cluster. However, in order to illuminate each mark individually, each mark requires its own light guide and light source. A typical example instrument cluster can have a significant number of separate indicators that require such lighting. Each light guide associated with each indicator is painstakingly assembled into the cluster one at a time. Consequently, the use of individual light guides requires a great deal of time and effort for assembly in the instrument cluster.

SUMMARY OF THE INVENTION

Disclosed is an instrumentation gauge for a vehicle including a light guide having a plurality of light guide connections, wherein each of said light guide connections is in communication with at least one of a plurality of first light sources, and wherein the light guide comprises a single piece, a dial disposed adjacent a first surface of said light guide, wherein said dial comprises an opaque portion, and at least one transparent portion, at least one telltale printed on a first surface of said light guide, wherein said telltale is printed in a color matching a color of said dial, and a lighthousing for communicating light from at least one second light source to said at least one transparent portion of said dial.

Also disclosed is a method of for illuminating a telltale in an instrument cluster including providing a single piece light guide having a plurality of sections, communicating light from a light source to one of said plurality of sections through a light guide leg, and scattering light in all directions at a telltale graphic, wherein the telltale graphic is printed on a surface of said light guide, thereby illuminating said telltale graphic.

Also disclosed is a light guide for an instrumentation gauge including a first surface facing a first direction, a second surface facing a second direction opposite said first direction, an opaque light guide insert dividing said first surface and said second surface into a plurality of light guide sections, at least one light guide leg extending from each of said light guide sections, wherein said light guide leg is operable to couple said light section with a light source disposed adjacent said light guide leg, and wherein each of said sections comprises a telltale graphic printed on said second surface within said section.

These and other features of the present invention can be best understood from the following specification and drawings, the following of which is a brief description.

BRIEF DESCRIPTION OF THE DRAWINGS

FIG. 3 schematically illustrates an exploded view of the instrumentation gauge of FIG. 2.

FIG. 4 schematically illustrates a cross section of the instrumentation gauge of FIG. 3.

FIG. 5 schematically illustrates a light guide component of an instrumentation gauge.

FIG. 6 schematically illustrates a cross section of the light guide component of an instrumentation gauge.

FIG. 7 schematically illustrates a cross section of an alternative light guide component to the light guide component of an instrumentation gauge.

DETAILED DESCRIPTION OF AN EMBODIMENT

Figure 1:
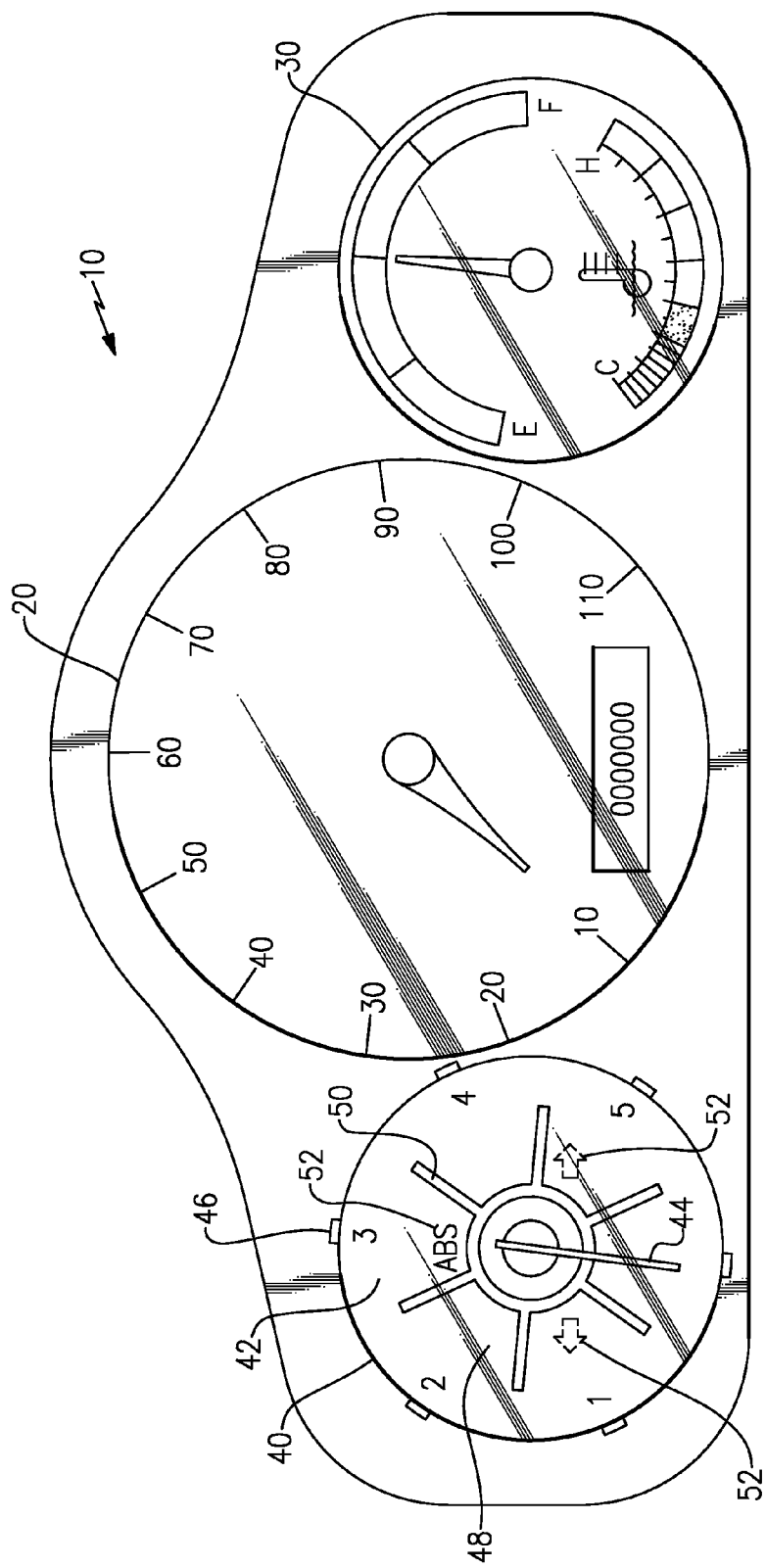
FIG. 1 schematically illustrates an instrument cluster for a vehicle.

FIG. 1 schematically illustrates an instrument cluster 10 for a vehicle. The instrument cluster 10, include standard gauges 20, 30, each of which indicates relevant vehicle operation information to a vehicle operator while the vehicle is being used. Also included in the instrument cluster 10 is an instrumentation gauge 40 that includes a light guide 42 and a pointer 44. The pointer 44 is controlled by a stepper motor in a standard automotive gauge configuration.

In the illustrated example, the light guide 42 includes a circular face facing the vehicle operator and a second circular face facing away from the vehicle operator, into the instrument cluster. Disposed about a radially outward edge of the light guide 42 are multiple light guide legs 46. Each light guide leg is arranged such that the leg 46 is in communication with a light source, such as an LED, inside the instrument cluster 10.

The light guide 42 is split into multiple sections 48 by an opaque light guide insert 50. The light guide insert 50 constrains light communicated through the legs 46 to a section 48 of the light guide 42 corresponding to the leg 46. In some examples, the light guide insert 50 is molded into the light guide 42 such that the light guide 42 and the light guide insert 50 form a singular component. One such molding technique is a two shot molding process. In alternate examples, the light guide insert 50 can be slotted into a corresponding slot, or void, in the light guide 42 as a separate component.

A dial is disposed behind the light guide 42. The dial is majority opaque, with white or color translucent graphics. In the illustrated example of FIG. 1, the white or color translucent graphics are numbers, although alternative graphics could be utilized in place of the illustrated numbers depending on the application of the instrumentation gauge 40. When operating during low light conditions, or any other conditions where the instrumentation gauge 40 should be illuminated, at least one light source is lit behind the dial. As the graphics are translucent with the remainder of the dial being opaque, light only passes through the graphics, thereby illuminating the graphics.

The light guide 42 further includes one or more instrumentation telltales 52 printed on the light guide surface facing away from the vehicle operator (toward the instrument cluster 10). The instrumentation telltales 52 are printed in a color close to, or matching, the color of the opaque portion of the dial. Due to the close color matching between the telltales 52 and the dial, when no light is entering the light guide 42 through the legs 46, the telltales 52 blend into the dial and are either not visible or are barely visible.

When a vehicle controller, or other vehicle component, determines that one of the telltales 52 should be illuminated, thereby conveying information to the vehicle operator, a light source in communication with the corresponding leg 46 is illuminated, causing the light guide to transmit light to the corresponding section 48. Due to the nature of light guides, light waves passing through the light guide 42 is directed in a single direction and is not visible to the vehicle operator until it exits the light guide 42. When the light waves encounter a telltale 52, printed on the light guide 42, the light is scattered in every direction. As a result of the light scattering, light is transmitted out of the light guide 42 and toward the operator. This illuminates the telltale 52 without illuminating the remainder of the section 48 or the dial behind the light guide 42.

Figure 2:
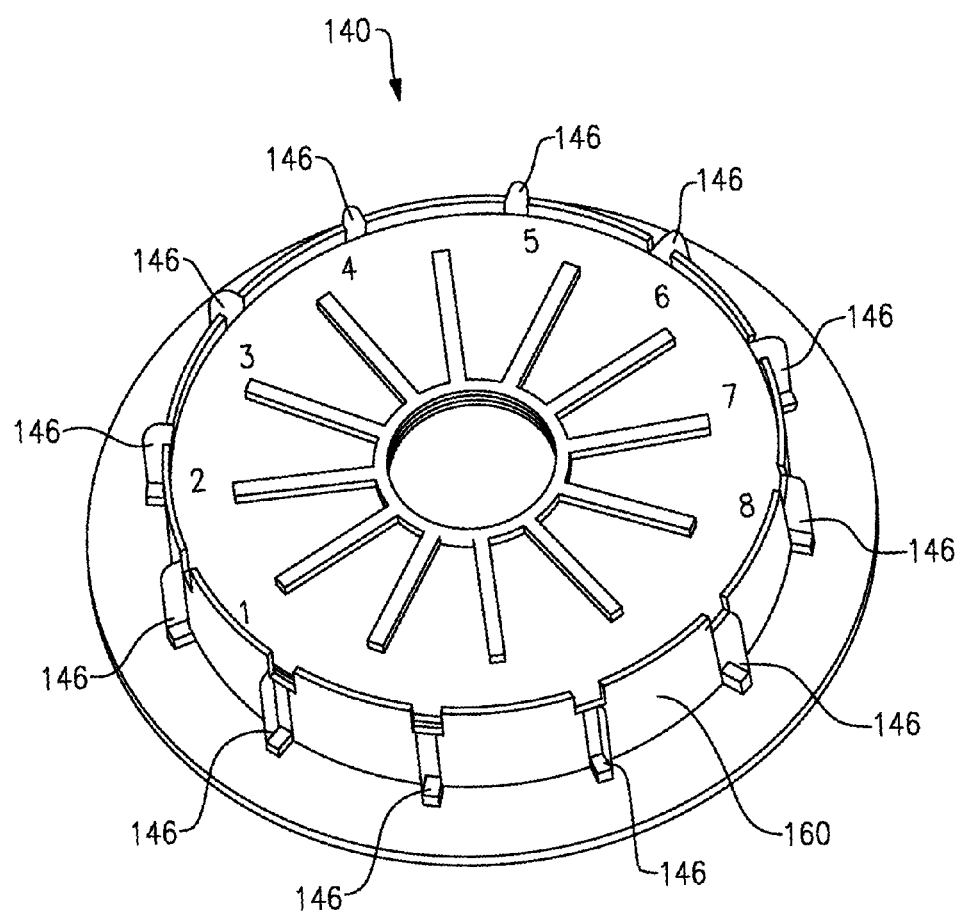
FIG. 2 schematically illustrates an instrumentation gauge for the instrument cluster of FIG. 1.

With continued reference to FIG. 1, FIG. 2 schematically illustrates a telltale illumination instrumentation gauge 40 isolated from the instrumentation cluster 10, of FIG. 1. The illustrated telltale illuminating instrumentation gauge 40 includes the features described above with regard to the instrumentation gauge 40 of FIG. 1. Additionally visible in the example of FIG. 2 is a lighthousing 160. The lighthousing 160 separates light from the light sources illuminating the graphics on the dial from the light sources illuminating each of the legs 146. The lighthousing 160 further maintains the instrumentation gauge 140 assembly and holds each of the components in place.

With continued reference to FIGS. 1 and 2, and with like numerals indicating like elements, FIG. 3 illustrates an exploded view of the instrumentation gauge 140 of FIG. 2. Similarly, FIG. 4 illustrates a cross sectional view of an assembled instrumentation gauge 140. As described above, a dial 170 is disposed adjacent the light guide 142. The dial 170 includes graphics 172 that function in conjunction with a pointer 44 (FIG. 1) that is controlled by a stepper motor (not pictured). Both the dial 170 and the light guide 142 are maintained in position relative to each other via a lighthousing 160. A circuit board 180 including light sources 182, 184 and circuitry to provide power to the light sources 182, 184 is positioned on an opposite end of the lighthousing 160, relative to the light guide 142.

The lighthousing 160 includes an interior wall 162 and an exterior wall 164. The interior wall 162 supports the dial 170 and the light guide 142 in an axial direction, while the exterior wall 164 provides a radial constraint on the light guide 142 and the dial 170. The exterior wall 164 further includes notches 166 for receiving the legs 146 of the light guide 142.

Defined between the interior wall 162 and the exterior wall 164 is a gap that allows transmission from a first set of light sources 184 to the graphics 172 on the dial 170. The lighthousing 160 is constructed of an opaque material, thereby preventing light from the first set of light sources 184 from escaping. A second set of light sources 182 is disposed radially outward of the first set of light sources 184 on the circuit boards 180. The second set of light sources 182 corresponds to the legs 146, with a single light source 182 corresponding to each of the legs 146. In alternate examples, multiple light sources 182 can correspond to each leg 146.

With continued reference to FIGS. 1-3, FIG. 4 illustrates a light guide 300 for use in an instrumentation gauge, such as the instrumentation gauges 40, 140 illustrated in FIGS. 1-3. The example light guide 300 is constructed of a clear material as a single piece. The single piece construction includes each of the legs 346. An insert slot 390 is formed in the light guide 300 for receiving the opaque lightguide insert 50 (illustrated in FIG. 1).

Multiple telltale graphics 352 are printed on one face of the light guide 300. Each of the telltale graphics 352 is positioned in one section, such that when a given section is illuminated, only the corresponding telltale graphic 352 is illuminated. Operation of the light guide sections is described below with regards to FIG. 6.

Each of the telltale graphics 352 is printed in a color that blends in with, or matches, the color of the opaque portion of the dial 172 (See FIGS. 3 and 4) when the section is not illuminated. In some examples, when the section is illuminated, the light reflected off the printed telltales alters the perceived color of the telltale, thereby allow the vehicle operator to easily distinguish the telltale from the background provided by the opaque portion of the dial 170. In other examples, the reflected light does not affect the color of the illuminated portion. In this way, the operator is aware of the illumination of the telltale, and the underlying message about the operational status of the vehicle.

FIG. 6 schematically illustrates a cross sectional view of an example light guide 500, with certain features exaggerated for explanatory effect. The light guide 500 includes multiple leg portions 510, each of which has an end face 512 facing a corresponding light source 520. When light is emitted from the light source 520, the light travels through the leg 510 and encounters a coupling region 530. The bend portion includes a curvature that is designed to couple light from the light source 520 with the horizontal portion 560 of the light guide 500. The particular curvature can be decided by one of skill in the art based upon practical considerations for the use and housing of the light guide 500.

In alternative examples, the coupling region 530 can be replaced with an angled surface, such as a forty-five degree angle (relative to a direction of light from the light source 520). In example systems where the coupling region 530 is significantly larger than a width 562 of the light guide 500, the illustrated coupling region 530 is ideal. In the alternative situation, where the bend portion 530 is not significantly larger than the width 562, a single angled surface is more ideally suited to the design.

In either example, the coupling region 530 couples the light from the light source 520 to the horizontal portion 560. Printed on an underside 554 of the horizontal portion 560 of the light guide 500 is a telltale 540. In an assembled instrumentation gauge 40 (FIG. 1), the underside 554 is the disc face of the light guide that is facing away from the observer and into the instrument cluster 10.

When the light being directed by the light guide 500 contacts the printed telltale 540, the light is scattered in every direction, as illustrated by the arrows 542. At least a portion of the light is scattered perpendicular, or approximately perpendicular to the printed telltale 540 and is directed toward the observer. The perpendicular or approximately perpendicular light can be observed by the observer causing the telltale 540 to appear illuminated. The non-scattered light remains within the light guide, and is not visible to the observer. In a practical system, a portion of the light being communicated through the light guide will leak out the outer face 552 and the inner face 554 of the horizontal segment 550. The leaked light is at a substantially low angle and will not be directed toward the observer. As a result, the dial placed adjacent the underside surface 554 is not illuminated, even when the telltale 540 is illuminated.

With continued reference to FIGS. 1-6, and with like numerals indicating like elements, FIG. 7 illustrates an alternative example light guide 600, with certain features exaggerated for explanatory effect. The light guide 600 includes multiple leg portions 610, each of which has an end face 612 facing a corresponding light source 620. When light is emitted from the light source 620, the light travels through the leg 610 and encounters a coupling region 630. The coupling region 630 includes a curvature that is designed to couple light from the light source 620 with a horizontal portion 660 of the light guide 600. The particular curvature can be decided by one of skill in the art based upon practical considerations for the use and housing of the light guide 500. As with the example of FIG. 6, in alternative examples the curvature of the coupling region 630 can be replaced with an angled surface.

The coupling region 630 couples the light from the light source 5620 to the horizontal portion 660. Printed on an underside 654 of the horizontal portion 660 of the light guide 600 is a telltale 640. In an assembled instrumentation gauge 40 (FIG. 1), the underside 654 is the disc face of the light guide that is facing away from the observer and into the instrument cluster 10.

In contrast to the horizontal portion 560 of FIG. 6, the horizontal portion 660 of FIG. 7 is angled, with the outer surface 652 and the inner surface 654 not being parallel to each other. As a result of the non-parallel surfaces 652, 654, the telltale 640 will appear skewed, or otherwise misaligned if the angles are not compensated for. The telltale 640 can be printed with a stretched or skewed perspective to counteract the angled surfaces, resulting in a non-skewed appearance.

While the above examples are described with regards to a circular instrumentation gauge and light guide, one of skill in the art will understand that the above principles can be equally applied to alternate shapes such as rectangles, triangles, and the like, without impacting the operation of the instrumentation gauge.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An instrumentation gauge for a vehicle comprising:
   a light guide comprising a plurality of light guide connections, wherein each of said light guide connections is in communication with at least one of a plurality of first light sources, and wherein the light guide comprises a single piece;
   a dial disposed adjacent a first surface of said light guide, wherein said dial comprises an opaque portion, and at least one translucent portion;
   at least one telltale printed on a first surface of said light guide, wherein said telltale is printed in a color at least approximately matching a color of said dial; and
   a lighthousing for communicating light from at least one second light source to said at least one translucent portion of said dial.

2. The instrumentation gauge of claim 1, wherein the single piece comprises including an opaque insert portion and a transparent light guide portion.

3. The instrumentation gauge of claim 1, further comprising at least one opaque insert received in an insert slot of said light guide.

4. The instrumentation gauge of claim 3, wherein the at least one opaque insert at least partially divides said light guide into a plurality of sections.

5. The light guide of claim 1, wherein each of said light guide connections is connected to a corresponding region of a face of said light guide via a coupling region in said light guide connection.

6. The instrumentation gauge of claim 5, wherein the coupling region includes a coupling surface having a curvature operable to reflect light traveling through said light guide connection to said corresponding region.

7. The instrumentation gauge of claim 5, wherein the coupling region comprises a coupling surface angled relative to a direction of light travel through said light guide connection, and wherein said coupling surface is operable to reflect light traveling through said light guide connection to said corresponding region.

8. The instrumentation gauge of claim 1, wherein said light housing comprises a first wall and a second wall, wherein the first wall circumscribes the second wall, and wherein the first wall constrains the dial form moving in a first direction and the second wall constrains the dial from moving in a second direction.

9. The instrumentation gauge of claim 1, wherein the color of said telltale and the color of said dial are each a shade of gray.

10. A light guide for an instrumentation gauge comprising;
    a first surface facing a first direction, a second surface facing a second direction opposite said first direction;
    an opaque light guide insert dividing said first surface and said second surface into a plurality of light guide sections;
    at least one light guide leg extending from each of said light guide sections, wherein said light guide leg is operable to couple said light section with a light source disposed adjacent said light guide leg; and
    wherein each of said sections comprises a telltale graphic printed on said second surface within said section.

11. The light guide of claim 10, wherein said opaque light guide insert is integral to said light guide.

12. The light guide of claim 10, wherein said opaque light guide insert is an insert received in a slot in said light guide.

13. The light guide of claim 10, wherein each of said telltales is printed using a color at least approximately matching a background color of an adjacent dial.

* * * * *